United States Patent [19]

Nozaki et al.

[11] Patent Number: 5,062,524
[45] Date of Patent: Nov. 5, 1991

[54] COURSE CHANGING DEVICE FOR CONVEYER SYSTEM

[75] Inventors: Yoshihisa Nozaki, Toyokawa; Takashi Inden; Tohur Takemura, both of Nagoya, all of Japan

[73] Assignee: Brother Kogyo Kabushiki Kaisha, Aichi, Japan

[21] Appl. No.: 558,079

[22] Filed: Jul. 25, 1990

[30] Foreign Application Priority Data

Jul. 26, 1989 [JP] Japan .................................. 1-193129

[51] Int. Cl.$^5$ ............................................ B65G 29/00
[52] U.S. Cl. ............................. 198/465.4; 198/465.1; 198/366
[58] Field of Search .................. 198/358, 349.5, 496.6, 198/362, 366, 369, 465.1, 465.4, 346.1; 104/35, 38, 48; 29/33 P

[56] References Cited

U.S. PATENT DOCUMENTS

| 618,396 | 1/1899 | Cowles | 198/465.4 X |
|---|---|---|---|
| 3,058,604 | 10/1962 | Harper et al. | 198/465.4 X |
| 3,113,659 | 12/1963 | Oda et al. | 198/465.4 |
| 3,592,141 | 7/1971 | Davidson | . |
| 4,239,116 | 12/1980 | Eisenberg | 209/523 |
| 4,291,797 | 9/1981 | Ewertowski | 198/342 |
| 4,326,624 | 4/1982 | Evertowski et al. | 104/35 X |
| 4,480,738 | 11/1984 | Mattson | 198/465.1 X |
| 4,637,108 | 1/1987 | Murata et al. | 198/465.1 X |
| 4,712,283 | 12/1987 | Bertorello | 198/346.1 X |
| 4,795,021 | 1/1989 | Moller | 198/465.1 X |
| 4,907,699 | 3/1990 | Butcher et al. | 198/465.4 X |

FOREIGN PATENT DOCUMENTS

| 2902724 | 8/1980 | Fed. Rep. of Germany | 198/362 |
|---|---|---|---|
| 2106465 | 4/1983 | United Kingdom | . |
| 2121366 | 12/1983 | United Kingdom | . |

OTHER PUBLICATIONS

Examiner's Search Report Appl. No. 9016103.5.
PCT International Appl. No. PCT/US87/00964.

Primary Examiner—Robert P. Olszewski
Assistant Examiner—James R. Bidwell
Attorney, Agent, or Firm—Kane, Dalsimer, Sullivan, Kurucz, Levy, Eisele and Richard

[57] ABSTRACT

An course changing device is equipped with a conveyor system in which a carrier member carrying a workpiece is conveyed among a plurality of working stations. In the conveyor system, a plurality of conveying members for conveying the carrier member are connected by way of the course changing device. The course changing device is provided with a rotating member for being driven to rotate, a plurality of support members provided on the rotating member for holding the carrier member transported from one of the conveying members, a motor for driving the rotating member, and control circuit for actuating the motor to drive the rotating member in accordance with the station which the carrier member held by the support member is directed to.

13 Claims, 11 Drawing Sheets

COURSE CHANGING DEVICE FOR CONVEYER SYSTEM

BACKGROUND OF THE INVENTION

The present invention relates to a course changing device equipped with a conveyer system for changing the course through which a carrier member, which carries a workpiece, is conveyed among work stations provided in the conveyer system.

Conventionally, a conveyer system for conveying carrier members such as hangers which hold a workpiece such as a sewing product in a sewing plant and the like has been known. In such conventional systems, endless main lines 66 are connected with a large number of sub-lines 65 each of which is provided with working stations such as sewing stations, each end of the main lines 66 being connected to a connection line 67 which is also formed to be endless, a carrier member which carries a workpiece being transferred from one sub-line 65 to another sub-line 65 along the main line 66 and the connection line 67 (refer to FIG. 1).

In the meantime, in many production fields including the sewing field, it is required that the layout of the conveyer system is flexibly modified or expanded in the plant because of the change of producing process. In addition, the carrier member is also required to be transferred to an objective station through the shortest route.

In the conventional structure described above, however, since the sub-lines 65 which are provided with working stations are connected with each other through the endless main line 66 and the connection line 67, the layout cannot be flexibly changed and expanded as desired.

Figure 1:
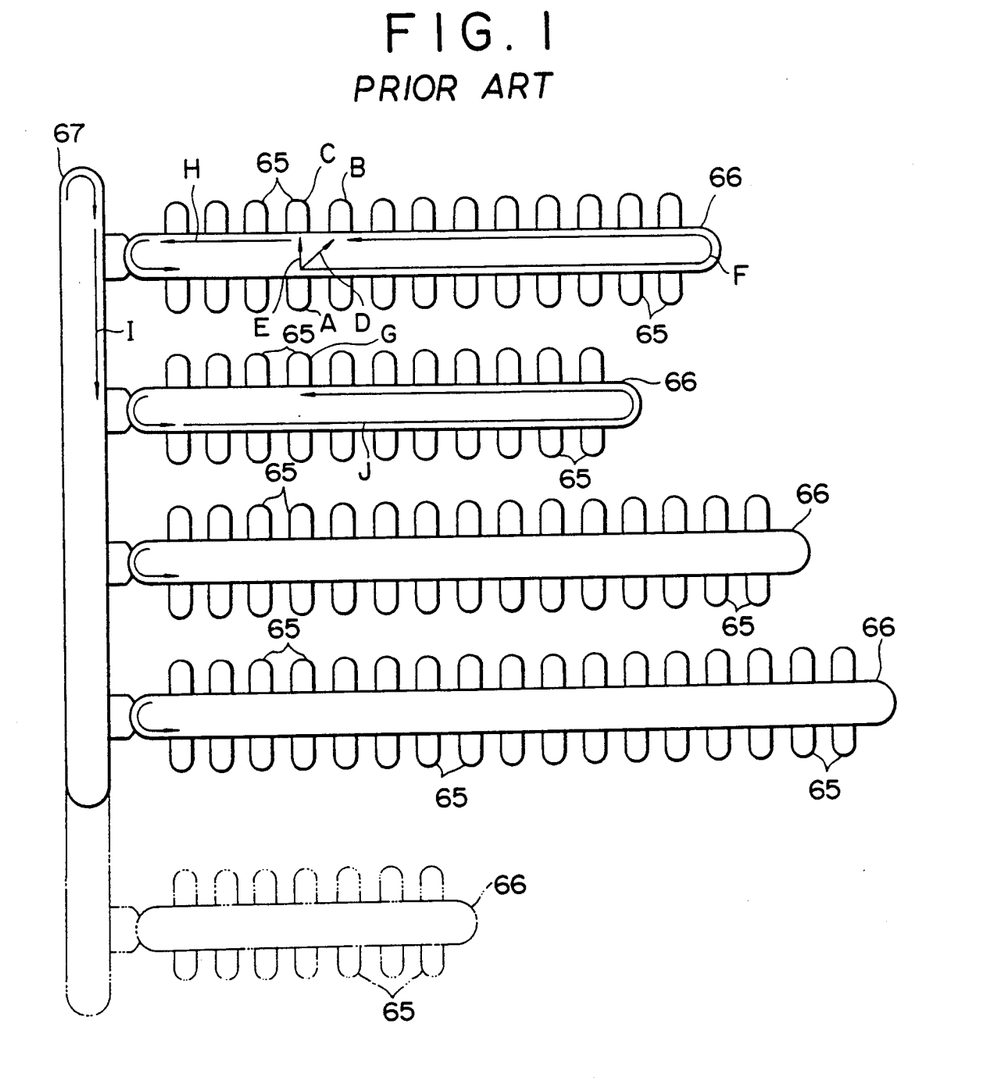
FIG. 1 is a schematic plan view of a conventional conveyer system.

As shown in FIG. 1, in the conventional conveyer system, each sub-line 65 is arranged in parallel around the main line 66, and each main line 66 is arranged in parallel around the connection line 67. Thus, the sub-lines 65, or the working stations cannot be flexibly networked. Moreover, as shown by two-dot lines in FIG. 1, when an another main line 66 which is provided with a plurality of sub-lines 65 is built, a very complicated work is required, that is, one end of the endless connection line 67 should be cut; new chains and rails should be additionally connected in order to stretch the entire system; and struts and fasteners which support the connection line 67 should be added.

In addition, during the construction period when the mainline 66 is expanded, for example, since the connection line 67 should be cut and inoperative, the entire operation of the conveyer system should be halted. To prevent that, conventionally, the facilities are built with estimating the future expansion, which results in losses of the investment, construction time period, and running cost.

Moreover, since each main line 66 and the connection line 67 always run in a single direction, two working stations on different two sub-lines 65 cannot be connected through the shortest route. Therefore, the hanger cannot be conveyed to the objective working station in a short time.

In FIG. 1, for example, although the working station A on the sub-line 65 is close to the station B or the station C on the same sub-line 65, the hanger can not be directly conveyed from the station A to the station B or the station C along the arrow D or E. Instead, as shown by the arrow F, the hanger should be conveyed through a roundabout way, thereby it takes relatively a long time.

Especially when the hanger is conveyed between working stations on different main lines 66, 66, such a problem is highlighted. For example, when the hanger is conveyed from the working station A on the sub-line 65 to a station G on the sub-line 65, it should be conveyed all the way along an arrow F, an arrow G, an arrow I, and an arrow J.

SUMMARY OF THE INVENTION

It is therefore an object of the invention to provide an improved course changing device to be equipped in a conveyer system so that the layout of the system can be flexibly modified or expanded and capable of conveying a carrier member supporting a workpiece to the desired working station through the relatively short route in a short period of time.

For the above objects, according to the invention, there is provided an course changing device to be equipped with a conveyer system in which a carrier member carrying a workpiece is conveyed among a plurality of working stations, said conveyer system comprising a plurality of conveying means for conveying said carrier member, said plurality of conveying means being connected by way of said course changing device, said course changing device comprising:

a rotating member for being driven to rotate;

holding means provided on said rotating member for holding said carrier member transported from one of said conveying means;

drive means for driving said rotating member; and control means for actuating said drive means to drive said rotating member in accordance with the station which said carrier member held by said holding means is directed to.

In the conveyer system provided with the course changing device constructed as above, a plurality of intermediate rails and station rails included in the conveying means are connected through the course changing device so that the conveyer system can be freely and flexibly laid out. Further, the layout of the conveyer system can be flexibly modified or expanded. Furthermore, with this course changing device, since the carrier member is allocated in a desired direction, the carrier member can be transferred to a destination through the shortest route in a relatively short time.

DESCRIPTION OF THE EMBODIMENTS

As shown in FIGS. 2 through 6, course changing units 1 are disposed with a certain interval between each other in a sewing plant or the like. Each course changing unit 1 is provided with a post 3 vertically disposed on a floor 2 (see FIG. 3). A mounting table 5 is secured at the top of the post 3, on which a supporting shaft 4 is vertically disposed. A supporting plate 6 is mounted on the top of the supporting shaft 4. A rectangular-frame-shaped supporting frame 7a for supporting a station rail 11 is securely supported on the upper surface of the supporting plate 6 at the middle section thereof. A pair of frames 7b arranged in parallel for supporting an intermediate rail 10 are stretched between the supporting plates 6, 6 of the course changing units 1, 1 and both ends of the pair of frames 7b, 7b are securely mounted on the supporting plates 6, 6 of the course changing units 1, 1, respectively.

Figure 2:
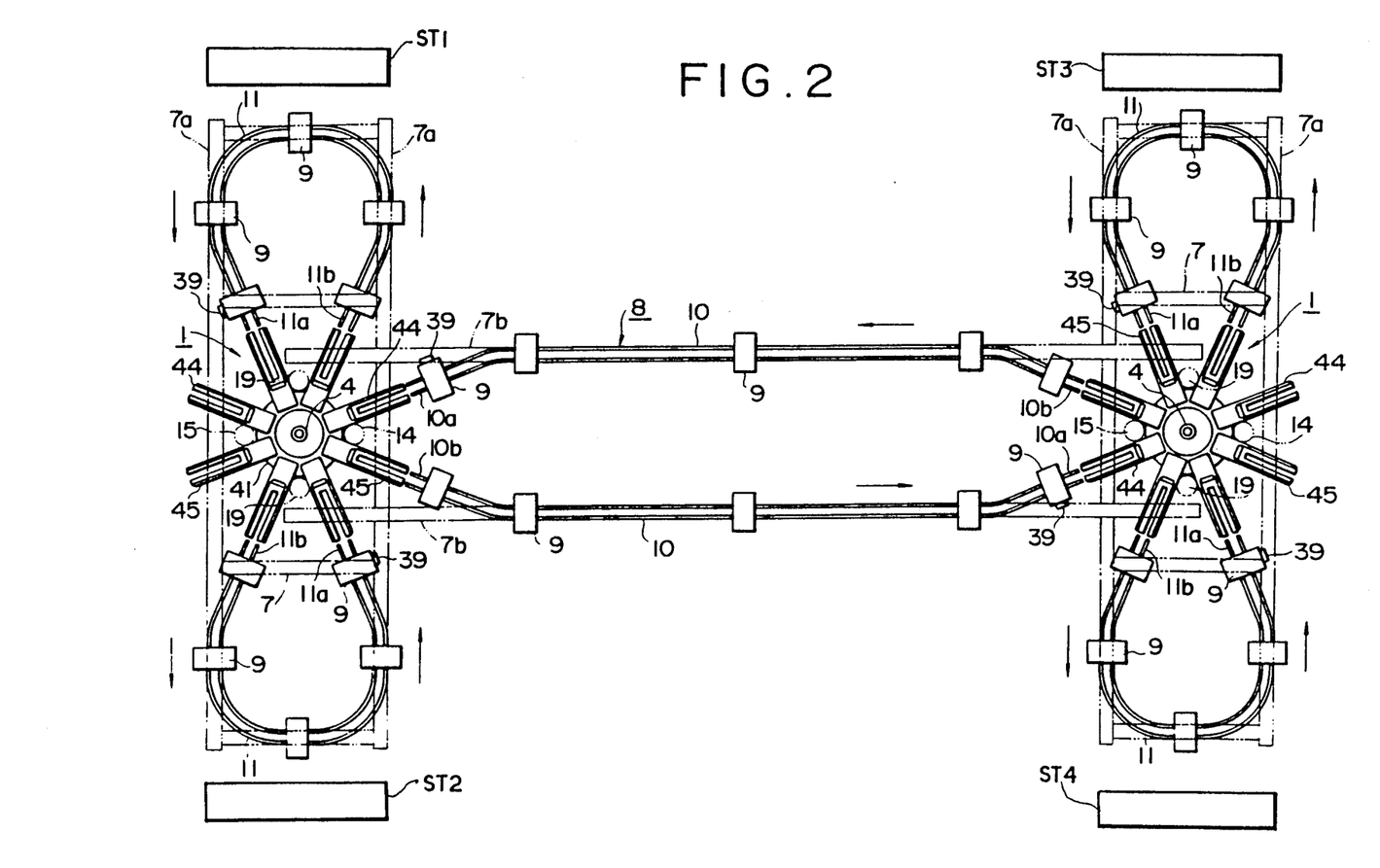
FIG. 2 is a partial plan view showing a hanger conveyer system embodying the present invention.

A hanger rail 8 is provided with a pair of intermediate rails 10 arranged in parallel and interposed between the course changing units 1, 1, which is suspended from the frame 7a and the frame 7b with a plurality of metal fittings 9, a plurality of U-shaped station rails 11 for working stations ST1, ST2, ST3, ST4, ... which are to be arranged in the vicinity of the course changing unit 1. Receiving sections 10a and 11a, and sending sections 10b and 11b are formed at both ends of the intermediate rail 10 and the station rail 11. The receiving sections 10a, 11a, and the sending sections 10b, 11b are arranged at the same height in the vicinity of the course changing unit 1 at predetermined angular intervals (in the present embodiment, at angular intervals of 45 degrees). The working stations ST1, ST2, ST3, ST4, ... consist of, for example, sewing units provided with sewing machines and the like disposed under the station rail 11.

Figure 3:
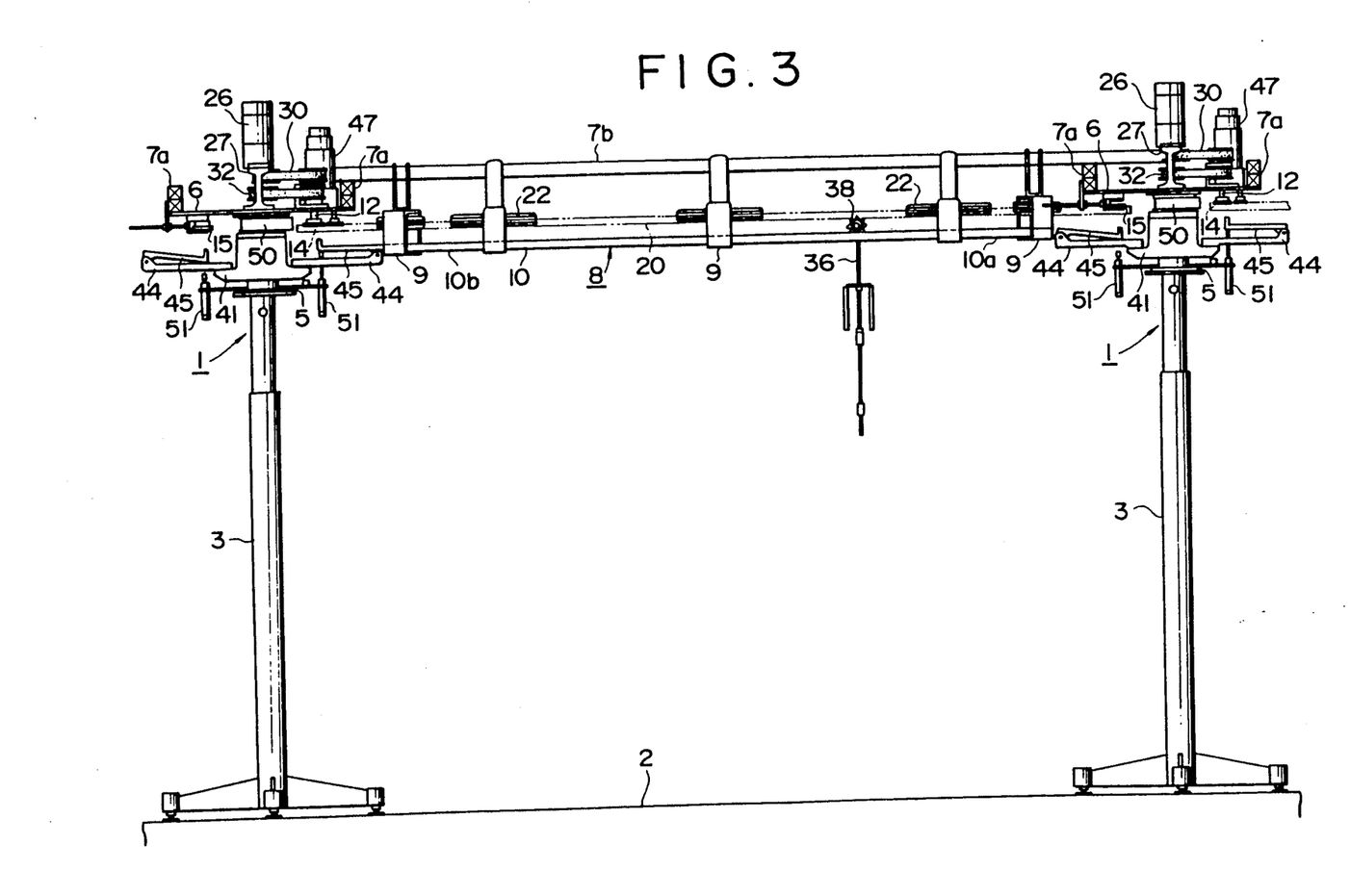
FIG. 3 is a partial side view of FIG. 2.
Figure 4:
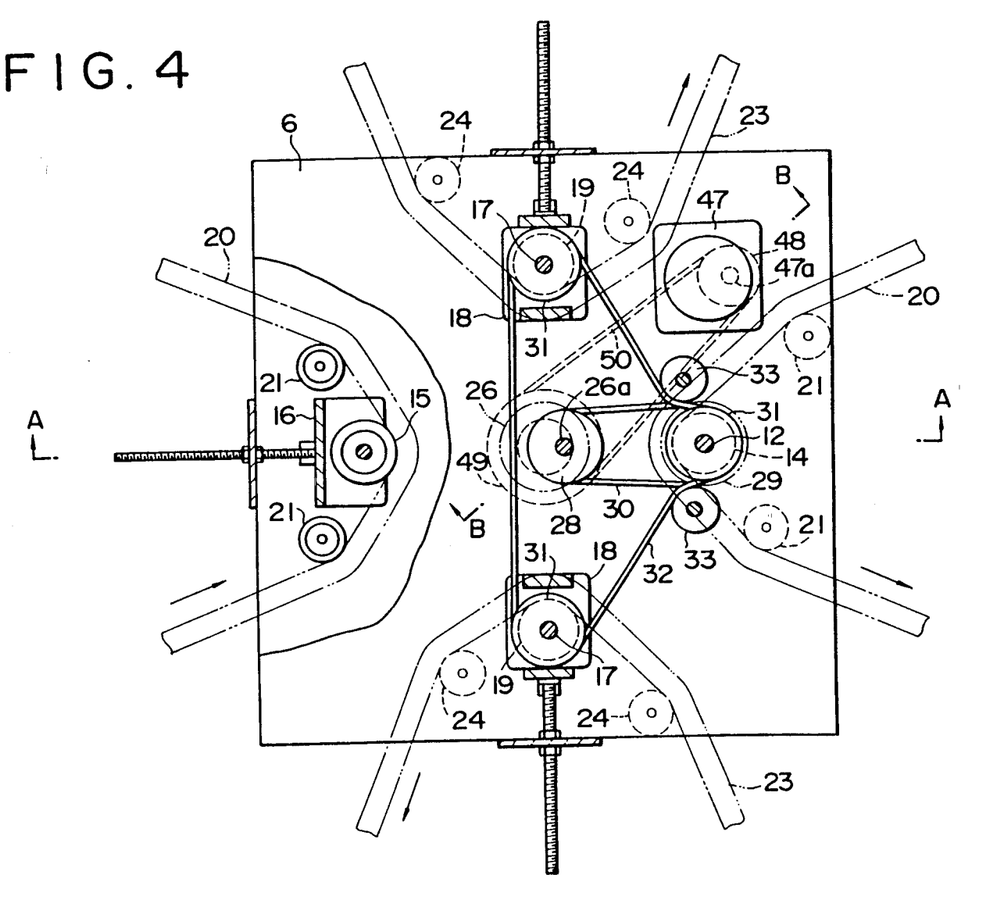
FIG. 4 is an enlarged partial sectional view showing a drive mechanism of a course changing unit.
Figure 5:
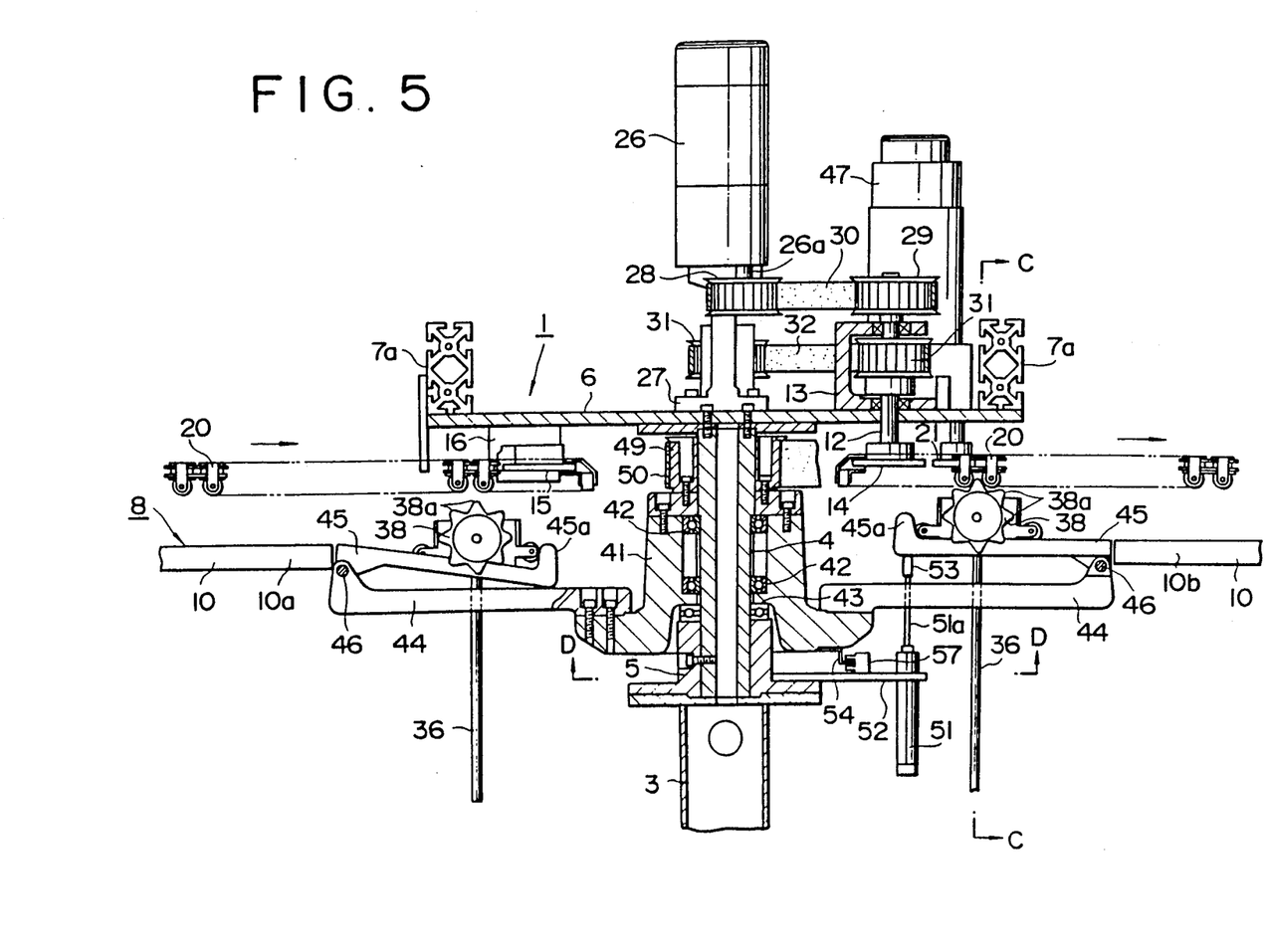
FIG. 5 is a partial sectional view taken from line A—A of FIG. 4.
Figure 6:
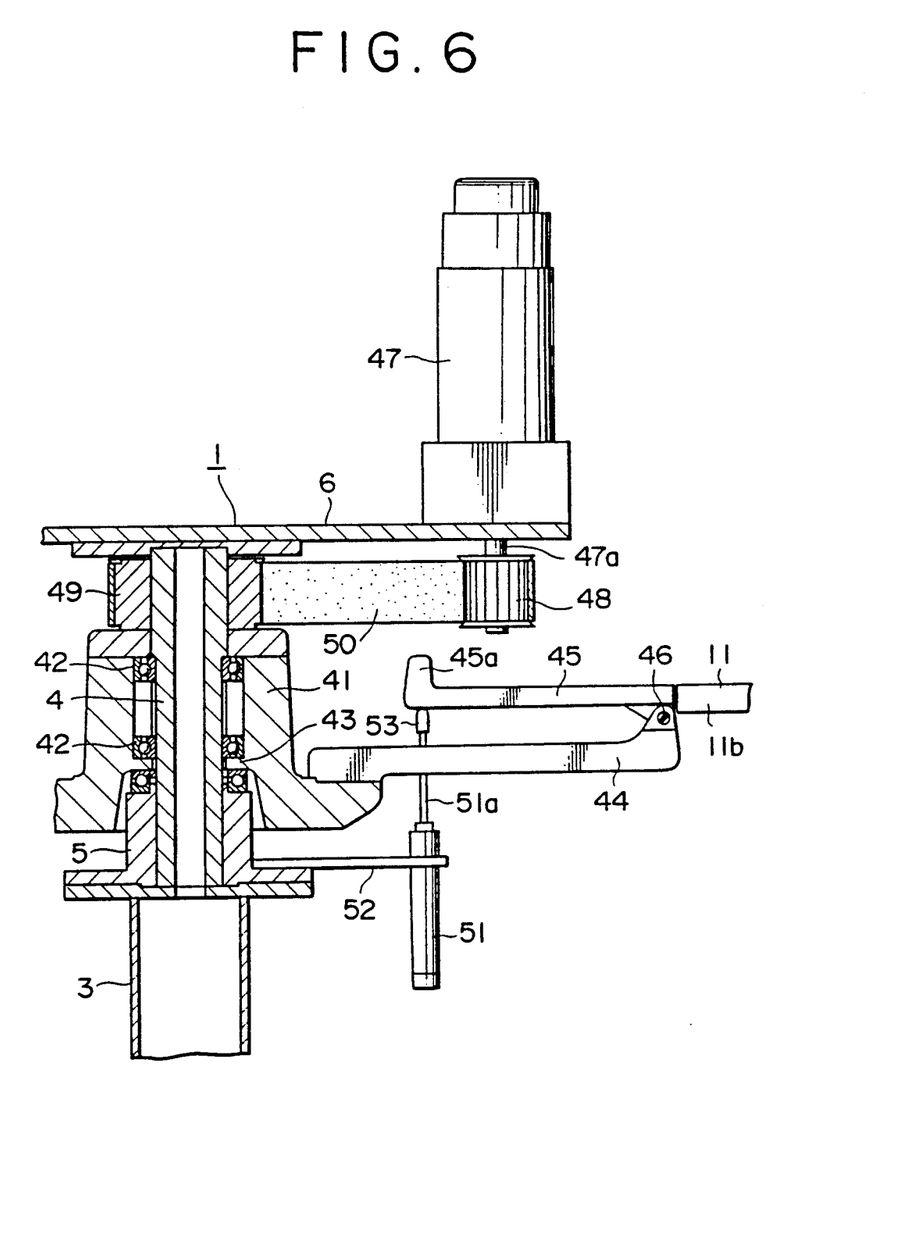
FIG. 6 is a partial sectional view taken from line B—B of FIG. 4.

As shown in FIGS. 3 to 5, a rotating shaft 12 is rotatably supported by and engaged with the supporting plate 6 of the course changing unit 1 by means of a fixing bracket 13, the rotating shaft 12 being engaged with the fixing bracket 13. A driving sprocket 14 is fixed to the lower end of the rotating shaft 12. A driven sprocket 15 is mounted on the under surface of the supporting plate 6 by means of a movable bracket 16 opposite to the driving sprocket 14 with the supporting shaft therebetween, the drive sprocket 15 being rotatable and position-adjustable. A pair of linking shafts 17 are rotatably and position-adjustably supported to the supporting plate 6 by means of a movable bracket 18, the linking shafts 17 being interposed between the driving sprocket 14 and the driven sprocket 15, the linking shafts 17 being engaged with the respective movable brackets 18. The lower end of each linking shaft 17 is fixed to a linking sprocket 19.

An endless first chain 20 is engaged between the driving sprocket 14 and the follower sprocket 15 of the course changing unit 1 disposed in the vicinity thereof, and is spread out along the intermediate rail 10 by means of both a plurality of guiding sprockets 21 disposed on the under surface of the supporting plate 6 and a plurality of chain guides 22 provided on the metal fittings 9. An endless second chain 23 is engaged with each linking sprocket 19, and is spread out along the station rail 11 by means of both a plurality of guiding sprockets 24 disposed on the under surface of the supporting plate 6 and a plurality of chain guides (not shown, similar to the chain guides 22) disposed on each metal fittings 9.

A chain driving motor 26 is mounted on the supporting plate 6 of the course changing unit 1 with a supporting leg 27. A motor shaft 26a is fixed with a driving pulley 28. A follower pulley 29 is fixed at the upper end of the rotating shaft 12. Between the follower pulley 29 and the driving pulley 28, a timing belt 30 is engaged. Three linking pulleys 31 are fixed at the midway of the rotating shaft 12 and at the top end of the linking shaft 17, respectively. These linking pulleys 31 are meshed with a timing belt 32. A pair of tension pulleys 33 rotatably supported on the supporting plate 6 apply certain amount of tension to the timing belt 32.

As the chain driving motor 26 revolves, the rotational force is transmitted through the driving pulley 28, the timing belt 30, and the follower pulley 29, the rotating shaft 12 is rotated counterclockwise in FIG. 3, the first chain 20 being traveled through the driving sprocket 14 in the counterclockwise direction. In addition, as the rotating shaft 12 rotates, both of the linking shafts 17 are rotated counterclockwise by way of the linking pulleys 31 and the timing belt 32, and both the second chains 23 are fed by means of the linking sprocket 19 in the same direction. Thus, as shown by the arrows of FIG. 2, the feeding directions on the pair of intermediate rails 10 between the course changing units 1 become reverse each other and the feeding direction on each station rail 11 becomes counterclockwise.

Figure 7:
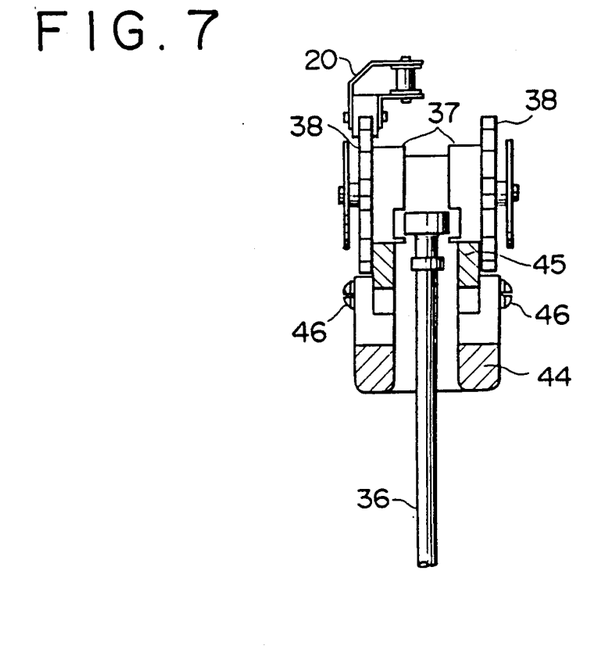
FIG. 7 is a partial sectional view taken from line C—C of FIG. 5.

As shown in FIGS. 3, 5, and 7, a hanger 36 as a carrier member is movably connected with the hanger rail 8 through a pair of rotatable rollers 37 so as to hang a workpiece such as a sewing product. A pair of engaging rings 38 having a plurality of engaging protrusions 38a on the outer periphery thereof are rotatably supported on the hanger 36. The rotation of the engaging rings 38 is neutrally restrained by a well-known frictional means (not shown). With the engaging protrusions 38a of the engaging rings 38 being engaged with the first chain 20 and the second chain 23, the first chain 20 and the second chain 23 are fed and thereby the hanger 36 is conveyed along the intermediate rail 10 or the station rail 11.

As shown in FIG. 2, hanger detection units 39 are provided on the metal fittings 9 of the receiving sections 10a and 11a of the intermediate rail 10 and the station rail 11. When the hanger 36 is conveyed to the position of the hanger detection unit 39 along the intermediate rail 10 or the station rail 11, according to a well-known method, a stopper (not shown) contacts the hanger 36 and thereby the transportation of the hanger 36 is temporarily stopped and a hanger identification code (not shown) on the hanger 36 is read by the hanger detection unit 39. While the hanger 36 stops, the chains 20 and 23 are continuously fed, however, the engaging rings 38 are idly rotated by the chains 20, 23 against the operation of the frictional means.

As shown in FIGS. 2, 3, 5, and 6, a rotating member 41 is rotatably supported to the supporting shaft 4 of the course changing unit 1 through a radial bearing 42. Between the lower end of the rotating member 41 and the mounting table 5, a thrust bearing 43 is provided. A plurality of course changing arms 44 (eight arms in this embodiment) radially disposed are outwardly spread out so that they face the receiving sections 10a and 11a and the sending sections 10b and 11b of the intermediate rail 10 and the station rail 11 at intervals of certain angles on the outer periphery of the rotating member 41 (at intervals of 45 degrees in this embodiment), respectively. The course changing arms 44 are spread out as far as to the positions overlapping the feeding range of the first chain 20 or the second chain 23.

A rocking rail 45 is pivoted at the end of each course changing arm 44 by a shaft 46, the inner end thereof forming an engaging protrusion 45a. As the left hand side one in FIG. 5, the rocking rail 45 is neutrally held inclined by the dead weight thereof. When the hanger 36 is received by the course changing arm 44 from the receiving sections 10a or 11a of the intermediate rail 10 or the station rail 11 by means of the first chain 20 or the second chain 23, the hanger 36 is lowered along the rocking rail 45 to the position engaged with the engaging protrusion 45a. Thus, the engagement of the engaging ring 38 with the first chain 20 or the second chain 23 is released.

As shown in FIGS. 3 to 6, a servo motor 47, which is forwardly and backwardly rotatable, is mounted on the supporting plate 6 as a drive means for driving the arms to rotate, a driving pulley 48 is secured to a motor shaft 47a. A follower pulley 49 which is engaged with the supporting shaft 4 is fixed on the upper surface of the rotating member 41. A timing belt 50 is engaged between the follower pulley 49 and the driving pulley 48. The servo motor 47 is rotated forwardly or backwardly so that the hanger 36 is transported to a desired working station based upon the detection result of the hanger detection unit 39. When the servo motor 47 is driven, the rotating member 41 is rotated by means of the driving pulley 48, the timing belt 50, and the follower pulley 49 forwardly or backwardly for 45 degrees or for a predetermined angle multiplied 45 degrees by certain integer. Thus, the course changing arm 44 which supports the hanger 36 is rockingly positioned so that it is opposed to the sending section 10b or 11b of the intermediate rail 10 or the station rail 11.

As shown in FIGS. 3 and 5, a plurality of push-up cylinders 51 are mounted on the mounting table 5 by means of a supporting plate 52 below respective course changing arms 44. At the upper end of a piston rod 51a, a push-up member 53 capable of engaging with the rocking rail 45 which is arranged over the course changing arm 44 is provided. The push-up cylinder 51 is connected to a control circuit 61 (refer to FIG. 9). The control circuit 61 neutrally causes the piston rod 51a of the push-up cylinder 51 to be inserted. When the rotation of the rotating member 41 is completed, the control circuit 61 causes the piston rod 51a to be protruded. In addition, as shown in FIG. 5, when the push-up member 53 is protruded from the push-up cylinder 51, the rocking rail 45 supporting the hanger 36 is rockingly moved from the inclined state to the horizontal state and thereby the engaging ring 38 of the hanger 36 is engaged with the first chain 20 or the second chain 23.

Figure 8:
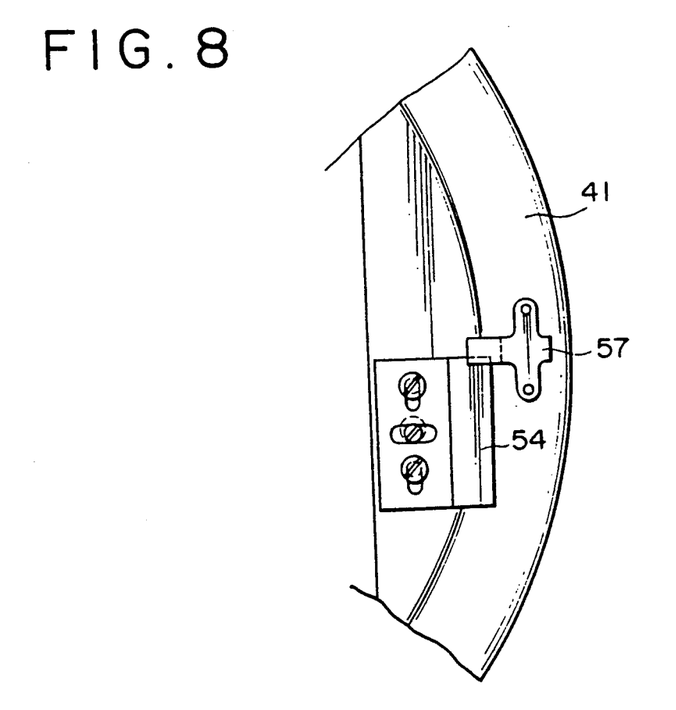
FIG. 8 is a partial sectional view taken from line D—D of FIG. 5.

As shown in FIGS. 5 and 8, a detected member 54 is provided on the lower surface of the rotating member 41 at a position corresponding to each course changing arm 44. A detector 57 is mounted on the supporting plate 52 at the position corresponding to the detected member 54. When the detector 57 detects the end portion of the detected member 54, the position of the rotating member 41 supporting the plurality of course changing arm 44 is detected. The control circuit 61 controls the servo motor 47 based upon the detection signal of the detected member 54 from the detector 57 in the feed-back manner. When the detected member 54 is detected, the course changing arm 44 is located opposed to the receiving section 10a or 11a and the sending section 10b or 11b of the intermediate rail 10 or the station rail 11.

Figure 9:
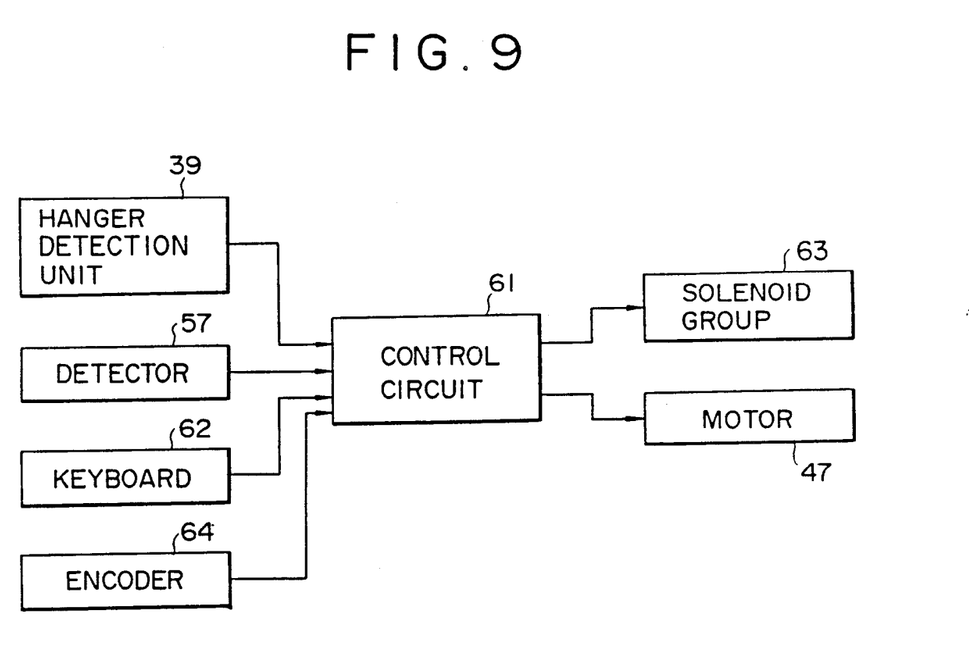
FIG. 9 is a block diagram showing a control system of the hanger conveyer system according to the present invention.

FIG. 9 is a block diagram showing a control system of the conveyer system embodying the present invention. In FIG. 9, an encoder 64 which is mounted on the motor 47 detects the amount of rotation of the motor 47, that is, the rotation angle of the course changing arm 44. A keyboard 62 is used for operating the entire system. The control circuit 61 controls the operation of the push-up cylinder 51 and the motor 47 based on the output of the hanger detection unit 39, the detector 57, the keyboard 62 and the encoder 64. In addition, according to the output from the control circuit 61, a solenoid group 63 of an electromagnetic valve manifold (not shown) selectively works. Thereby, an intake or exhaust state takes place in a particular push-up cylinder 51 and then the push-up member 53 is moved upwardly or downwardly.

In the hanger conveyer system according to the present invention, when the chain driving motor 26 provided in each course changing unit 1 for driving the chain is rotated, as shown in FIGS. 4 and 5, the first chain 20 is fed counterclockwise in FIG. 4 along the intermediate rail 10 by means of the driving pulley 28, the timing belt 30, and so forth. As the rotating shaft 12 is rotated, the second chain 23 is fed along the station rail 11 in the same direction by means of the linking pulleys 31, the timing belt 32, and so forth.

Figure 10:
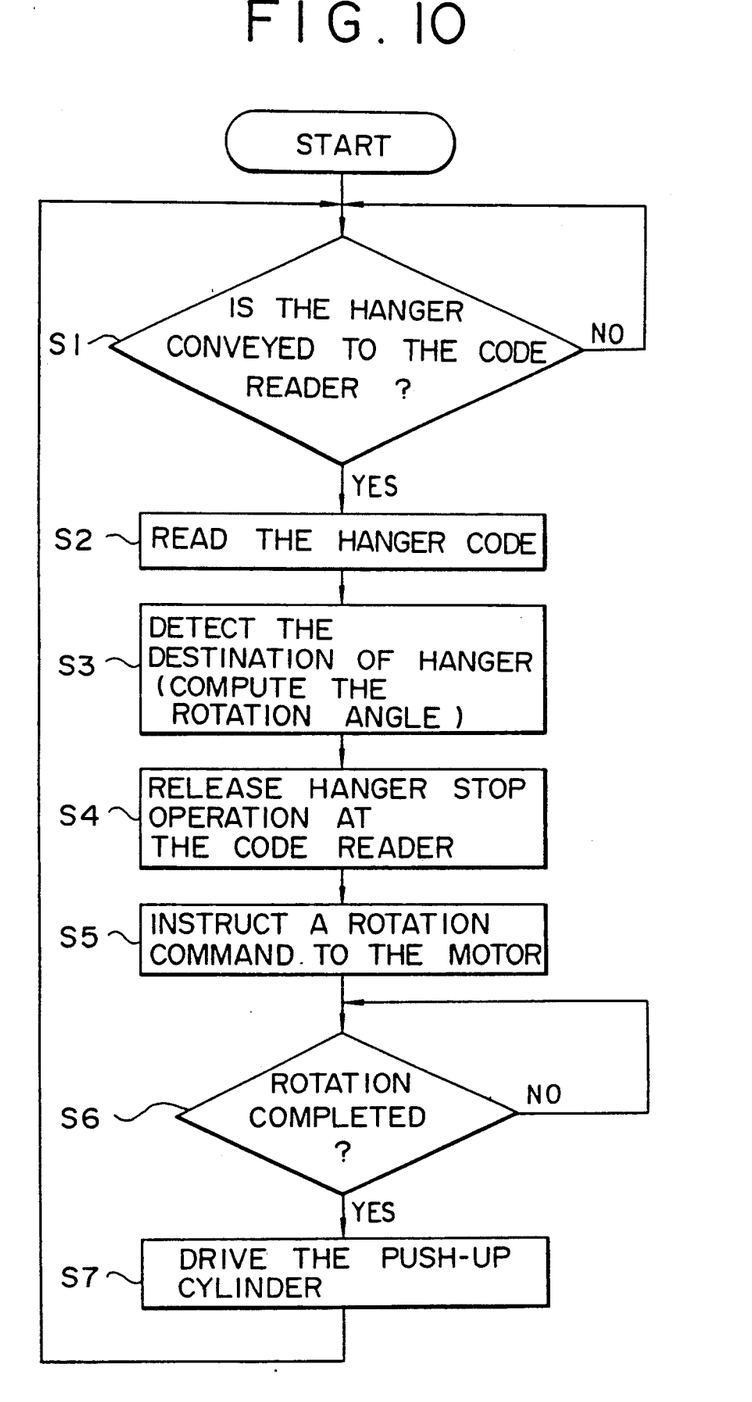
FIG. 10 is a flow chart illustrating an operation of the hanger conveyer system according to the present invention.

Thus, the hanger 36 carrying a workpiece are supported on the intermediate rail 10 or the station rail 11 and conveyed in the direction shown by the arrows in FIG. 2 while the engaging ring 38 is being engaged with the first chain 20 or the second chain 23. When the hanger 36 is conveyed to the position corresponding to the hanger detection unit 39 (code reader) in step S1 of FIG. 10, a stopper (not shown) is protruded on the transporting route of the hanger 36. Thereby, the transportation of the hanger 36 is temporarily stopped and a hanger identification code on the hanger 36 is read by the hanger detection unit 39 (in step S2). The control circuit 61 computes the rotation amount of the course changing arm 44 (in step S3).

After the reading operation took place, the stopper is retracted (in step S4) and the transportation of the hanger 36 is restarted. As shown in FIG. 5, the hanger 36 is sent to the course changing arm 44 from the receiving section 10a or 11a of the intermediate rail 10 or the station rail 11 and then the hanger 36 is directed to the lower position where the hanger 36 is engaged with the engaging protrusion 45a on the rocking rail 45 in the inclined state by its dead weight. Thus, the engaging ring 38 is disengaged from the first chain 20 or the second chain 23 and the hanger 36 is statically held on the rocking rail 45. In this state, based upon the detection of the hanger detection unit 39, the control circuit 61 outputs the signal for rotating the servo motor 47 according to the computation result (in step S5), the rotating member 41 is rotated forwardly or backwardly for a certain angle by the servo motor 47 through the driving pulley 48 and so forth. Thus, the course changing arm 44 supporting the hanger 36 is rotated in the position opposite to the sending section 10b or 11b of the intermediate rail 10 or the station rail 11.

The rotation of the rotation member 41 is completed (in step S6), a push-up member 53 corresponding to the course changing arm 44 which supports the hanger 36 is raised from the push-up cylinder 51 (in step S7). Thus, the rocking arm 45 is rotated from the inclined state to the horizontal state and the hanger 36 is raised up. Consequently, the engaging ring 38 is engaged with the first chain 20 or the second chain 23. As the first chain 20 and the second chain 23 are being fed, the hanger 36 is sent to the sending section 10b or 11b of the intermediate rail 10 or the station rail 11 from the course changing arm 44 and then transported to the subsequent course changing unit 1 along the intermediate rail 10 or to a specified working station provided along the station rail 11.

When the hanger 36 is located at the position corresponding to the working station on the station rail 11, the stopper consists of a well-known mechanism which is protruded on the station rail 11 and the transportation of the hanger 36 is stopped. A worker, for example, a sewing worker or the like removes a workpiece such as sewing product from the hanger 36, sews it, and returns it to the hanger 36. After that, the stopper is retracted and the transporting of the hanger 36 is started again.

According to the hanger conveyer system of the present invention, the system is structured by a set of the course changing unit 1, the intermediate rail 10 disposed between the course changing unit 1 and another course changing unit 1, and the station rail 11 disposed around the course changing unit 1. Thus, the layout of the system can be freely made by installing the required number of course changing units 1, the intermediate rails 10 being provided between the course changing units 1, the station rails 11 being arbitrarily disposed in the vicinity of the course changing unit 1.

Figure 11:
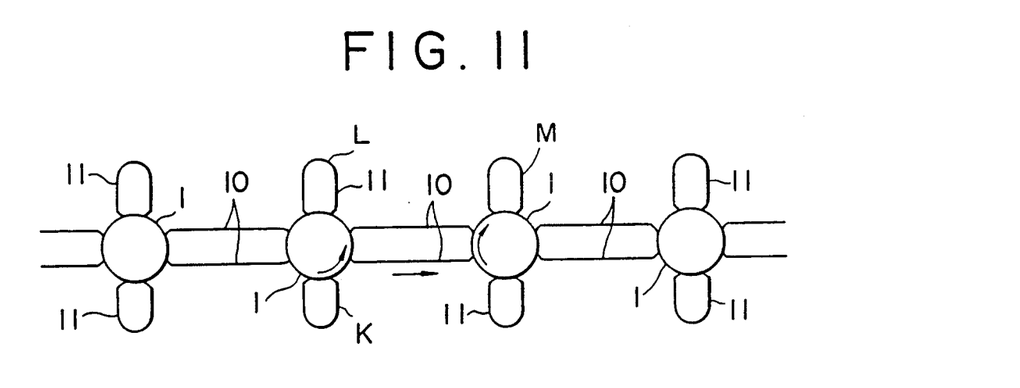
FIGS. 11 and 12 are plan views outlining the hanger conveyer system of the embodiment.

FIG. 11 shows an example of a layout of the conveyer system, in which the course changing units 1 are arranged in a straightly arranged in a row, a pair of intermediate rails 10 being positioned between two course changing units 1.

Figure 12:
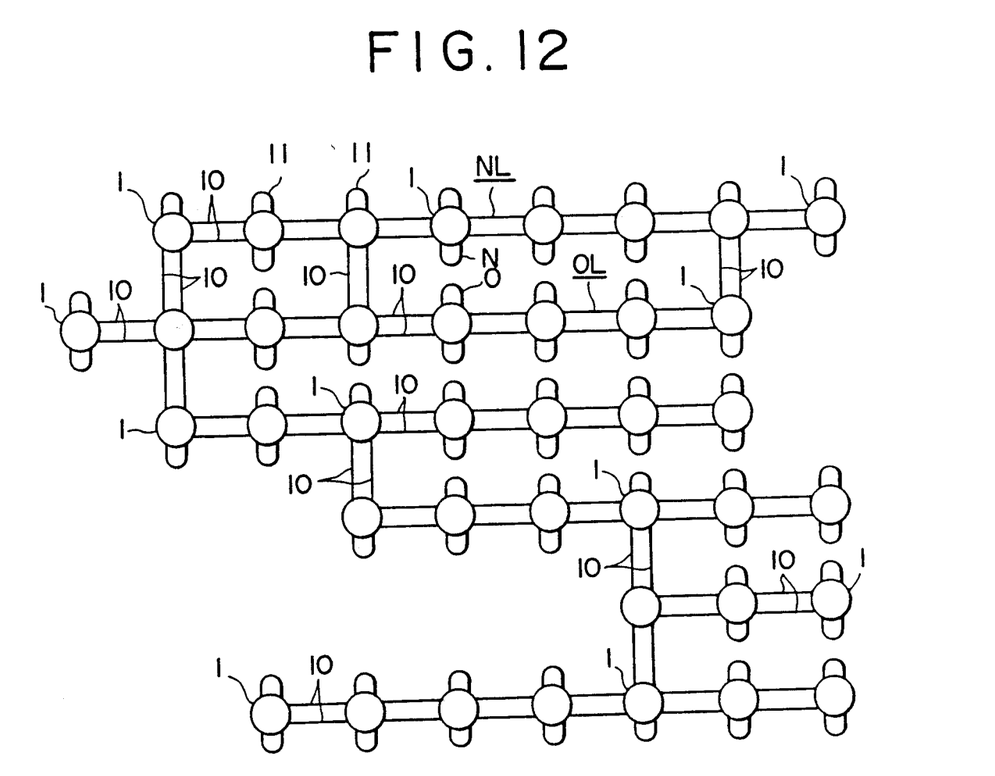

FIG. 12 shows another example of a layout of the conveyer system. In FIG. 12, a plurality of course changing units 1 are arranged lengthwise and breadthwise at certain distances, the intermediate rails 10 being provided between the two course changing units 1 which are adjacently disposed in one direction. Further, the intermediate rails 10 are provided between desired two course changing units 1 which are adjacently disposed in the other direction. Thus, the station rails 11 provided in the vicinity of each course changing units 1 for working stations are networked. The system can be freely laid out in a straight shape or in a network shape. In this case, since the distance between the receiving section 10a or 11a and the sending section 10b or 11b of the intermediate rail 10 or the station rail 11 accords with that between the course changing arms 44, the number of the intermediate rails 10 and the station rails 11 can be increased, decreased, or changed without any difficulties, therefore the layout of the system can be freely made.

In addition, by increasing or decreasing the number of the course changing units 1 and that of the intermediate rails 10 and the station rails 11 which associate therewith, the layout can be flexibly changed and/or expanded. In other words, since the entire system is composed of a combination of sets described above, as opposed to the conventional structure, any complicated works such as cutting out and addition of lines are avoidable. The works required in the system are to install or remove the post 3 of the course changing unit 1 on or from the ground and to change the positions and the number of the intermediate rails 10 and the station rails 11. In addition, unlike the conventional system shown in FIG. 1, since each set of the system independently works, even while the system is under construction, it is not necessary to stop the other sets of the system. In other words, since the layout of the system can be easily changed and/or expanded without stopping the entire system, a loss of excessive facility construction for future expansion can be prevented.

In addition, in the hanger conveyer system according to the present invention, since the hanger 36 which hangs a workpiece such as a sewing product is directed to a specified direction in the course changing unit 1, it is possible to convey the hanger 36 on the shortest route at a short time. In other words, when the hanger 36 is conveyed from the position K to the position L shown in FIG. 11, the hanger 36 can be conveyed to the position L by only rotating the course changing unit 1 rather than through a roundabout way as shown by the arrow F in FIG. 1. When the hanger 36 is conveyed from the position K to the position M, the course changing unit 1 corresponding to the position K is rotated, the hanger 36 being placed at the portion where the feeding direction of the intermediate rail 10 is the position K, the course changing unit 1 corresponding to the position M to which the hanger 36 is fed being rotated to the position M. In addition, in FIG. 12, when the hanger is conveyed from the position N to the position O, it can be conveyed on the shortest route through the close intermediate rail 10 connected between the line NL of the position N and the line OL of the position O. Thus, by properly selecting a combination of the intermediate rail 10 and the station rail 11, the hanger 36 can be conveyed to a destination in a short time.

The present invention does not limit to the structure described above. It will be readily apparent to those skilled in the art that various modifications may be made and other embodiments implemented without departing from the scope of the invention concept.

Figure 13:
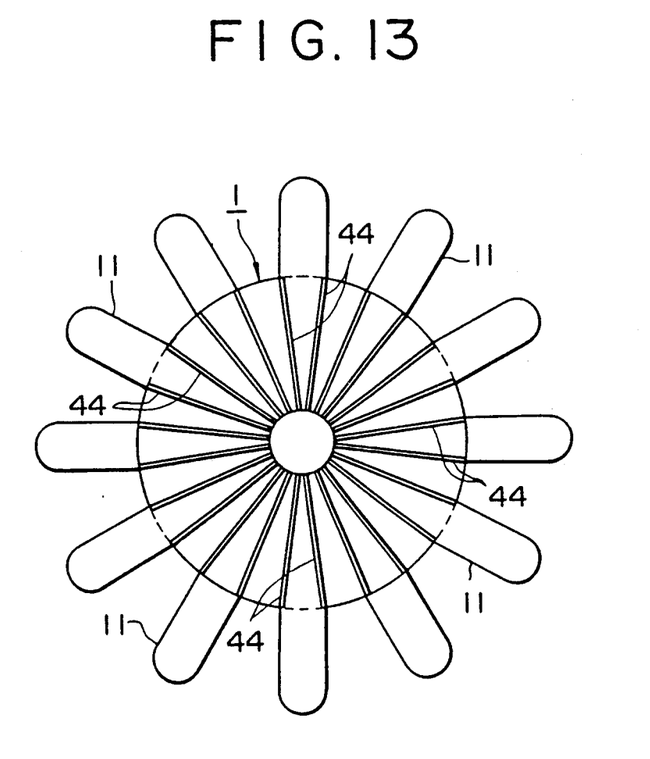
FIG. 13 shows a schematic partial plan view of a modification of the course changing unit.

FIG. 13 shows a modification of an course changing unit 1 of the embodiment. In this modification, the number of the course changing arms 44 radially disposed in the course changing unit 1 is increased, a plurality of station rails 11 for working stations being opposed to the course changing arms 44 and being disposed also radially in the vicinity of the course changing unit 1.

Further, timing belts are used instead of the first and second chains.

Furthermore, the present invention may employ so-called gravity system in which the hanger is conveyed by its dead weight through the intermediate rails and the station rails which are all arranged to be inclined. In this case, although units for raising the hanger to incline for moving by its dead weight are required in the holding means and the related section, no chains and no motors for conveying the hanger are needed.

Still further, each section may be readily modified to differently embody the present invention. For example, the carrier member may be structured by a supporting member other than the hanger.

Since the present invention is structured as described above, the layout of the conveyer system can be made straightly or in a network shape with flexibility against its change and expansion. In addition, the carrier member which hangs a workpiece can be transferred between two working stations on the shortest route at a short time and thereby excellent effects can be obtained.

What is claimed is:

1. A course changing device employed in a conveyer system, wherein carrier members carrying workpieces are conveyed among a plurality of working stations by way of said course changing device, said conveyer system including guide means for guiding said carrier members in a predetermined direction, and feeding means for conveying said carrier members along said guide means, said course changing device comprising:
   a rotating member for being driven to rotate;
   drive means for driving said rotating member;
   a plurality of support means provided on said rotating member for guiding and supporting said carrier members, said plurality of support means being radially arranged, each of said support means having an outer end and an inner end being rockable with respect to the outer end thereof so that the inner end of each of said support means is capable of being rocked between an upper position and a lower position;
   shifting means for driving said support means to be shifted between said upper and lower positions, wherein said support means is capable of sending said carrier member supporting thereon to said guide means when said support means is shifted to said upper position by said shifting means, and wherein said support means is capable of receiving said carrier member from said guide means when said support means is shifted to said lower position by said shifting means; and
   control means for controlling said drive means in accordance with the station which said carrier member supported by said plurality of support means is directed to.

2. The course changing device according to claim 1, wherein said control means locates said support means at said lower position when said rotating member is being rotated.

3. The course changing device according to claim 2, which further comprises indicating means for indicating the station which said carrier member is directed to, and wherein said control means drives said drive means based on the indication provided by said indicating means so that said carrier member is conveyed along the guide means corresponding to the station to which said carrier member is directed.

4. The course changing device according to claim 3, wherein said indicating means comprises:
   a code mark on said carrier member, said code mark carrying at least a data of the station to which said carrier member is transferred; and
   code read means for reading said code mark, said data read by said code read means being transmitted to said control means.

5. The course changing device according to claim 4, which further comprises position finding means for detecting the rotary position of said rotating member.

6. The course changing device according to claim 5, which further comprises computing means for computing the angle with which said rotating member is to be rotated based on said data read by said code read means and the rotary position of said rotating member detected by said position finding means.

7. The course changing device according to claim 6, wherein said position finding means comprises:
   a positioning member secured onto said rotating member; and
   position detecting means for detecting the rotary position of said rotating member by detecting the portion of said positioning member.

8. The course changing device according to claim 7, wherein said guide means comprises a rail member, said support means comprises another rail member, one end of which is to be oppositely located to one end of said rail member, and wherein said carrier member comprises a body member to be movably supported astride one of said rail member and said another rail member.

9. The course changing device according to claim 8, wherein a plurality of another pairs of rail members are radially and symmetrically arranged with respect to a rotary axis of said rotating member.

10. The course changing device according to claim 9, wherein said another rail member are pivoted at said one end so as to be shifted between said upper and lower positions, and said course changing device further comprises shifting means for shifting said another rail member to said upper position, said another rail member being neutrally located at said lower position with the dead weight thereof.

11. The course changing device according to claim 10, wherein said carrier means comprises an engaging member to be engaged with said feeding means, said engaging member being engaged with said feeding means when said carrier member is supported on said another rail member which is located in said upper position, while said engaging member being disengaged from said feeding means when said carrier member is supported on said another rail member which is located in said lower position.

12. The course changing device according to claim 11, which further comprises computing means for computing the angle with which said rotating member is to be rotated based on said data read by said code read means and the rotary position of said rotating member detected by said position finding means.

13. A conveyer system in which carrier members carrying workpieces are conveyed, said conveyer system comprising:
   a plurality of conveyer rails, said carrier members being conveyed along said conveyer rails, one ends of said plurality of conveyer rails being arranged along a predetermined circle;
   a plurality of arm members capable of being rotated about the axis of said predetermined circle and having an inner end and an outer end, said outer end of each of said arm members being pivoted so that said inner end of each of said arm members is rockable, said outer end of each of said arm members being capable of being located opposite to a desired one of said one ends of said plurality of conveyer rails;
   holding means for holding said carrier member provided on each of said arm members;
   drive means for driving said arm members so that said outer end of each of said arm members is located opposite to each of said one ends of said plurality of conveyer rails;
   control means for controlling said drive means so that the outer end of a predetermined one of said arm members is located opposite to a predetermined one of said one ends of said plurality of conveyer rails in response to a predetermined instruction; and
   transport means for transporting said carrier member between one of said outer ends of said arm members and one of said one ends of said plurality of conveyer rails.

* * * * *